United States Patent [19]

Seemann

[11] 4,347,835

[45] Sep. 7, 1982

[54] ALL SEASON WINDOW

[76] Inventor: Robert A. Seemann, 89 Earl Ave., Hamden, Conn. 06514

[21] Appl. No.: 52,770

[22] Filed: Jun. 28, 1979

[51] Int. Cl.³ .............................................. F24J 3/02
[52] U.S. Cl. .................................. 126/431; 126/432; 52/171; 52/788
[58] Field of Search ............... 126/417, 419, 428, 431, 126/432, 900; 160/44; 98/885, 99.6, 100; 52/171, 788, 173; 47/17

[56] References Cited

U.S. PATENT DOCUMENTS

| 3,695,681 | 10/1972 | Dockery | 52/171 |
| 3,877,706 | 4/1975 | Okawa | 52/788 |
| 3,981,294 | 9/1976 | Deminet | 126/900 |
| 4,108,373 | 8/1978 | Chiapale | 126/900 |

FOREIGN PATENT DOCUMENTS

| 699912 | 11/1940 | Fed. Rep. of Germany | 52/788 |
| 2507753 | 8/1976 | Fed. Rep. of Germany | 52/788 |
| 576379 | 10/1977 | U.S.S.R. | 52/171 |

Primary Examiner—Samuel Scott
Assistant Examiner—G. Anderson

[57] ABSTRACT

An all season window includes a rectilinear peripherally extending pane mounting frame. Three panes of transparent material are secured sealingly within the frame in parallel spaced relationship and extend vertically. A solar heat ray absorbent material is contained within the frame. In one preferred form of the invention the solar heat ray absorbent material is a liquid. A pump and associated motor is provided for pumping the solar heat ray absorbent liquid between a first location in which it fills the region between the outer and intermediate panes and a second location in which the liquid fills the region between the inner and intermediate panes. In its described first location solar heat rays are absorbed by the liquid and a dead air space between the liquid and the closed environment sought to be provided with climatic control inhibits conduction of heat to such closed environment while the liquid conducts heat received thereby due to solar radiation through the outer pane to the outside environment. Such an arrangement of the solar heat ray absorbent material within the pane mounting frame is desirable during summer months. During winter months when it is desirable to minimize a loss of heat from the closed environment the solar heat ray absorbent material is moved to the region beween the inner pane and the intermediate pane.

18 Claims, 8 Drawing Figures

ALL SEASON WINDOW

BACKGROUND OF THE INVENTION

The present invention relates to solar energy systems and more particularly to an all season window construction whereby loss of heat from an interior closed environment to the outside is minimized during cold weather and transmission of heat from the outside to the interior closed environment is minimized during seasons when the outside temperature is relatively high.

There has for some time heretofore been a recognition of the need to control the transfer of solar energy from the outside environment to a closed environment during the warm weather months and to prevent the transfer of heat from the closed environment to the outside during the cold weather months while concomitantly retaining a clear unobstructed view through the window arrangement employed to effectuate such control. Accordingly, a variety of window constructions have been proposed and have been known prior to the present invention. Such earlier constructions, however, have failed to provide the optimum control sought, have required unduly complex structural arrangements or have interfered with the clear visibility expected of window constructions. U.S. Pat. No. 2,918,709 issued Dec. 29, 1959 to L. J. Corcoran, for example, discloses a window unit which incorporates therein a heat radiating section and a dead air space. The unit is given trunnions so that it can be mounted pivotably in a window frame for reversal as desired according to the season. Alternatively, since the relative location of the heat radiating and dead air sections is fixed, the unit can be mounted in the window frame and manually removed therefrom for reversal to meet the seasonal requirements. Such a unit poses the problem of selecting a time for reversal when indoor and outside temperature and humidity are substantially the same in order to avoid heat or air conditioning loss from the closed environment and the entry of rain during inclement weather. Further, in the case of the pivotal mounting of the unit in the window frame problems are apt to arise in connection with the sealing of the unit in the window frame. With the advent of energy shortages throughout the world the demand for more effective control of heat transfer through window constructions, especially via the utilization of solar energy, has become extremely important and in fact crucial.

SUMMARY OF THE INVENTION

It is one object of the invention to provide an all season window which affords effective control of solar energy during all seasons of the year while preserving unobstructed image transmission therethrough.

It is another object of the invention to provide a window construction permitting effective heat transfer control therethrough during warm and cold weather seasons without requiring relocation of the window in accordance with the changes in season.

It is still another object of the invention to provide an all season window construction which can be readily integrated with the automatic environmental control system of an enclosed environment such as a room or other interior region of a building.

Other objects and advantages of the invention will become readily apparent to persons versed in the art from the ensuing description thereof.

In accordance with the invention there is provided an all season window comprising a peripherally extending pane mounting frame; first, second and third panes of transparent sheet material mounted sealingly within the frame in spaced parallel relationship each to the other. The second pane is interposed between the first and third panes. A solar heat ray absorbent material, which may be a liquid or a sheet or film having such characteristics, is contained within the frame so as to be movable selectively between a first location within the region between the first and second panes at which location it occupies substantially the entire area of one side of the second pane and a second location within the region between the second and third panes at which second location it occupies substantially the entire area of the other side of the second pane. A pump and associated motor enable selective movement of the solar heat ray absorbent material between the first and second locations.

BRIEF DESCRIPTION OF THE DRAWINGS

In order that the invention may be more fully comprehended it will now be described, by way of example, with reference to the accompanying drawings, in which.

DESCRIPTION OF THE PREFERRED EMBODIMENTS

Figure 1:
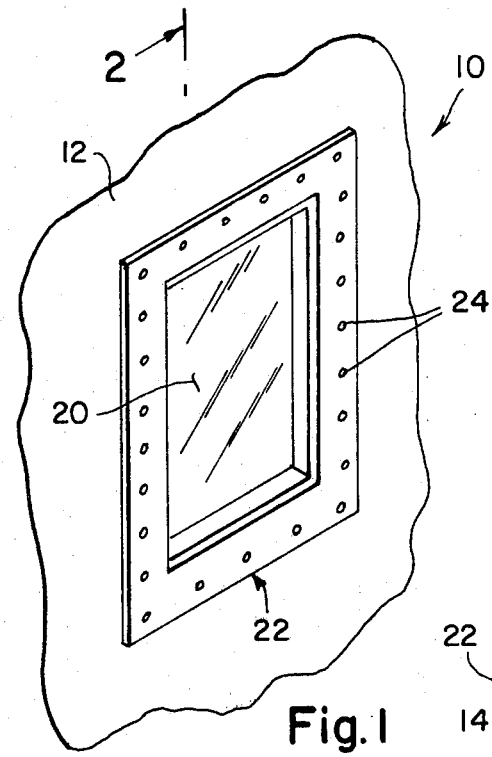
FIG. 1 is a perspective view of a window embodying the features of the invention.
Figure 8:
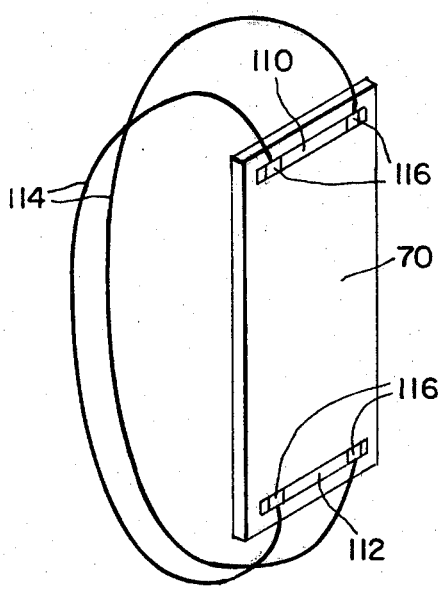
FIG. 8 is a broken perspective view of the closed loop of material employed in the embodiment of FIGS. 3-7 showing the string-like elements connected to a sheet of solar heat ray absorbent material to form the closed loop and transverse stiffeners.

Before explaining the invention in detail it is to be understood that the invention is not limited in its application to the details of construction and arrangement of parts illustrated in the drawings since the invention is capable of other embodiments and of being practiced or carried out in various ways. It is also to be understood that the phraseology or terminology employed is for the purpose of description only and not of limitation.

Referring to the drawings, in which like parts are similarly designated, there is shown a window 10 installed within an exterior wall 12 of a building or other structure. The window is permanently positioned within such wall in conventional manner and may be provided with a caulked joint as is customary. The window includes a sash or pane mounting frame 14 which extends peripherally to completely enclose the panes set therein. Generally such frame 14 is given a rectilinear configuration; however, it will be appreciated that the specific shape may be determined in accordance with the architectural design of the building and the provision made therein for the windows.

Positioned within frame 14 and sealed with respect thereto are a series of three panes of transparent sheet material 16, 18 and 20. The panes may be made of glass or of a clear transparent plastics material as desired. It will be noted that pane 16 is mounted within frame 14 as the innermost pane, pane 20 is mounted as the outermost pane and is the pane which is exposed to the outside environment. The third pane 18 is mounted so as to be intermediate the other two panes. All of such panes are set vertically within the frame 14 in spaced parallel relationship. The sealing of panes 16, 18 and 20 within frame 14 should be fluid tight.

Figure 2:
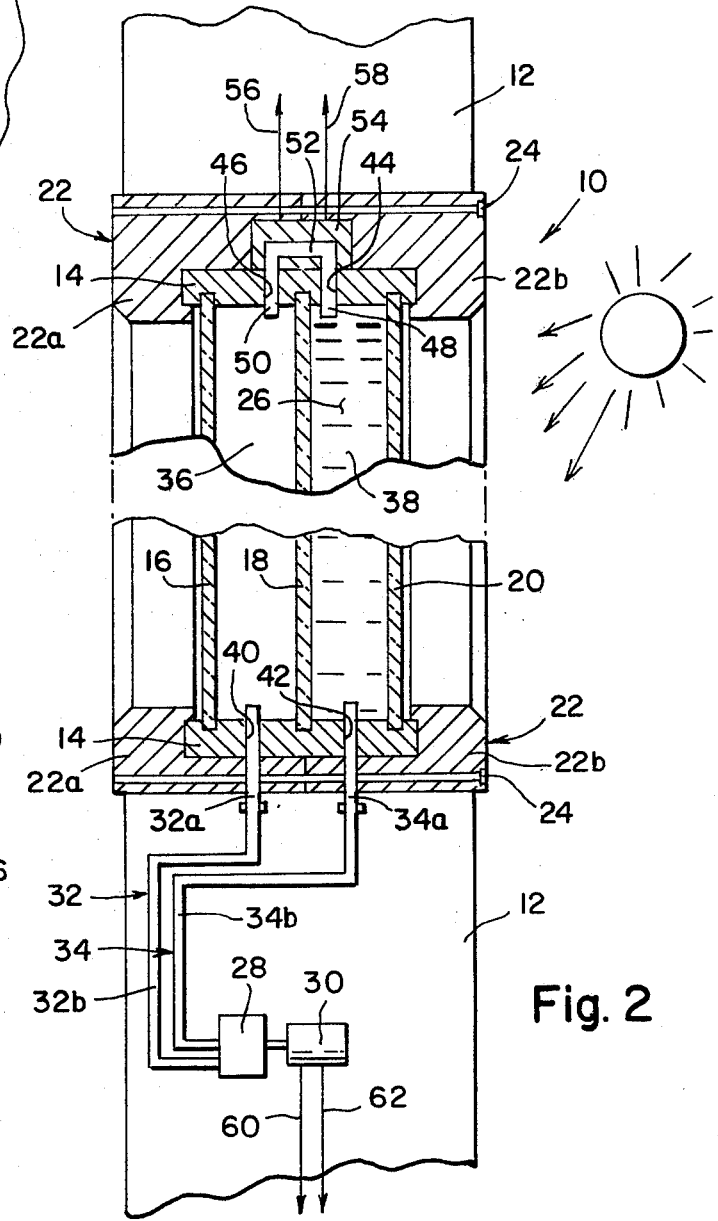
FIG. 2 is a side elevational view, in cross-section, of the window shown in FIG. 1 taken along line 2—2 thereof.
Figures 3, 4, 5, 6, 7:
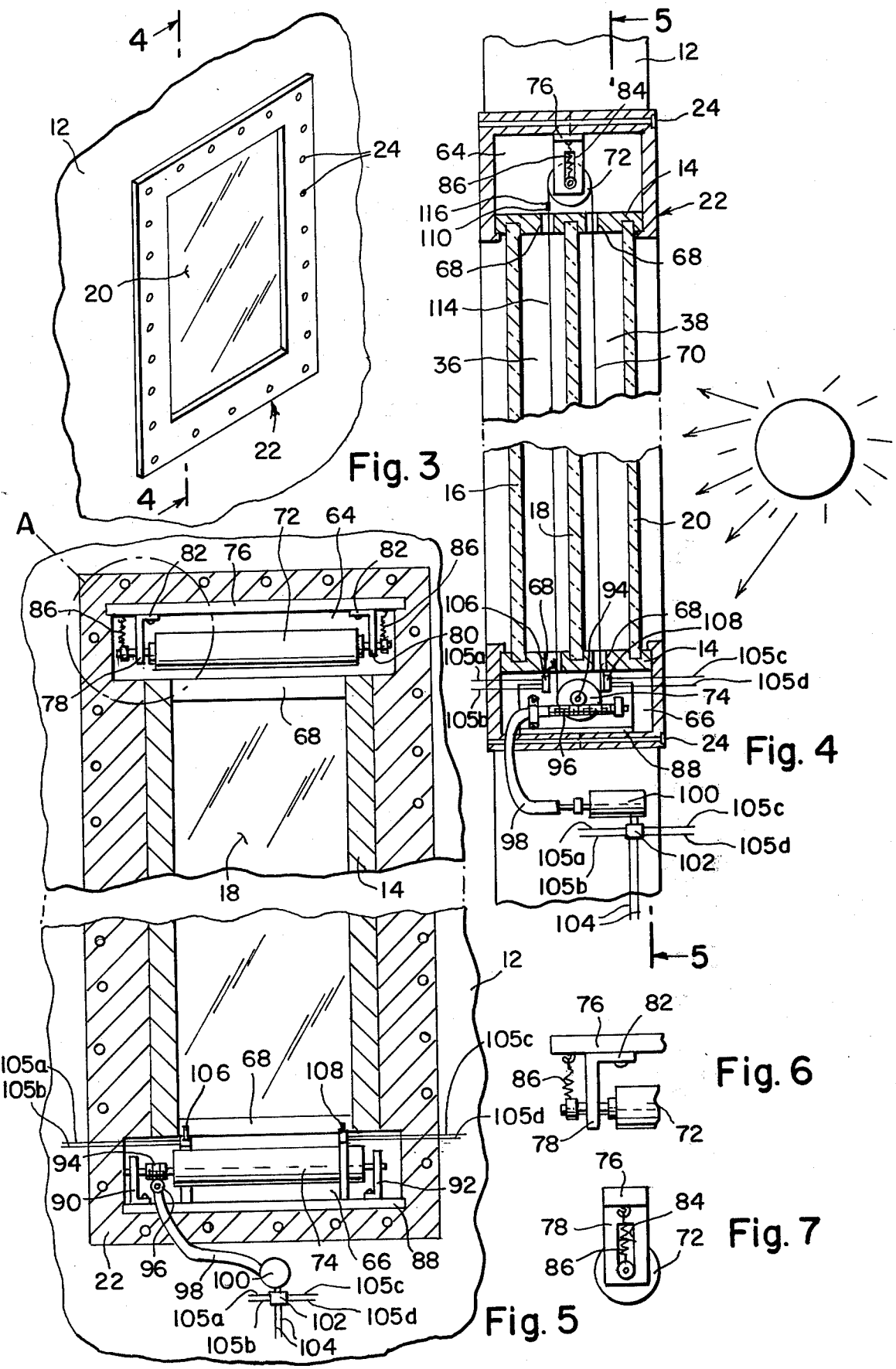
FIG. 3 is a perspective view of a window embodying the features of the invention in accordance with a modification of the embodiment shown in FIGS. 1 and 2.
FIG. 4 is a side elevational view, in cross-section, of the window shown in FIG. 3 taken along line 4—4 thereof.
FIG. 5 is a front elevational view, in cross-section, of the window shown in FIG. 4 taken along line 5—5 thereof.
FIG. 6 is an enlarged front elevational view of the inset area A of FIG. 5.
FIG. 7 is an enlarged side elevational view of the inset area A of FIG. 5.

Referring particularly to FIG. 2 it will be observed that a second frame 22 peripherally encloses pane mounting frame 14. Frame 22 consists of a pair of peripherally extending sections 22a, 22b which are releasably connectable such as by means of a bolt 24 which is of sufficient length to extend through the sections of the frame. A plurality of such bolts may be provided in spaced relation throughout the peripheral extent of the frame sections, the spacing to be selected in accordance with the specific window design, size of the bolts, etc. The use of bolts as contrasted with nails or other fastening means is preferred because of the enhanced capability of separation of sections 22a and 22b. Although it is contemplated that the window, once assembled and installed in enclosure wall 12, will be a permanent installation it is desirable that provision be made for disassembly in an expeditious manner in the event that there is need for replacement of any of the components thereof.

As can be seen most clearly in FIG. 2, a liquid 26 is introduced into the region of the window between the outermost and intermediate panes 20, 18. The level of liquid should be such that substantially the entire exposed area of pane 18 is covered. The liquid should not affect image sharpness and therefore should be selected so that it will not wet the panes in a manner which leaves streaking or adhered droplets behind on the panes of one region when the liquid is moved to an alternate region as described hereinafter. Accordingly, the liquid should be selected from those liquids which will not wet the panes when in contact therewith and it is also within the contemplation of the invention and the art to include a "wetting agent" in the liquid to minimize adhered droplets and streaking which would prevent sharp unobstructed view through the panes. The liquid should be capable of absorbing the solar heat rays to which it will be subjected. Persons versed in the art of solar radiation apparatus will readily be able to select an appropriate liquid. Preferably the liquid should be clear or colorless so as not to interfere with the transmission of sharp images through the window. However, if desired, a minor amount of a coloring agent may be added to afford tinting.

Although it was suggested previously that the liquid be introduced between the outermost and intermediate panes it will be recognized that the location of the liquid in such position is recommended for warm weather seasons at which times the heat produced in the liquid as a result of solar radiation will be transferred by conduction to outer pane 20 and thence dissipated to the outside by conduction and/or convection. The region between the intermediate and inner panes 18, 16 at such times will serve in the nature of a dead air space to minimize any conduction of heat to the closed environment thereby enabling the maintenance of desired climatic conditions within such environment. On the other hand, during periods of cold weather the liquid is introduced between the panes 16, 18. At such times solar rays passing through pane 20 and through pane 18 will produce heat within the liquid raising its temperature. The heat contained in the liquid will be transferred by conduction through pane 16 to the closed environment thereby contributing to the heating of such environment and reducing the heating requirements for maintenance of a predetermined temperature therein. The region between panes 18, 20 at such times serves in the nature of a dead air space and inhibits the transfer of heat to the outside environment.

In order to allow for the transfer of the solar heat ray absorbent material back and forth between the respective regions between the intermediate and outer panes 18, 20 and the intermediate and inner panes 18, 16 in accordance with seasonal demands there is provided a pump 28 and a motor 30 coupled drivably therewith. The motor is desirably electric and reversible for reasons which will become clear. A first set of liquid transfer tubes or conduits 32, 34 communicate respectively with the regions 36, 38 between the intermediate and inner panes 18, 16 and between the intermediate and outer panes 18, 20 in the lower portion of the frame 14. Such tubes or conduits 32, 34 also communicate at their opposite ends with the pump 28. It is presently preferred that each of tubes or conduits 32, 34 include relatively rigid segments 32a, 34a and flexible segments 32b, 34b. This arrangement permits the pump 28, motor 30 and tube segments 32b, 34b to be treated as a unitary motorized pump package and facilitates installation of such a package such as by connection of the flexible tubes to the rigid segments through use of detachable clamp-like fittings. The tube segments 32a, 34a are set within appropriate apertures 40, 42 formed in frame 14 and project slightly into the regions between the panes.

At the upper portion of frame 14 there are formed apertures 44, 46 to accomodate a second set of liquid transfer tubes or conduits 48, 50. Desirably the upper extremities of tubes 48, 50 are interconnected by an overflow by-pass tube 52. A limit switch 54 is positioned within a suitable space provided therefor in frame 22, the limit switch having sensors (not shown) operably associated with either the interior of tubes 48, 50 of regions 36, 38 so that when liquid rises within the region being employed depending upon the particular season (within region 36 or 38) to a predetermined level the limit switch, connected electrically by means of wires 56, 58 to motor 30, acts to deactivate the motor and pump. Liquid is thus prevented from being pumped into the region to be reserved as the dead air space as described above. Limit switches of the type presently available commercially are effective in achieving the desired level control of the liquid and will be known to the skilled mechanic so that a detailed description of switches is not necessary and will only encumber the present specification. The limit switch will not permit reactivation of the motor unless the level of liquid recedes to a point below the predetermined level or until the voltage for the motor is reversed so as to transfer the liquid to the other region between the panes previously reserved as the dead air space. Motor 30 is provided with conductors 60, 62 to supply power thereto from an external electric power supply. It will be understood, of course, that switching may be also provided which interconnects the motor with an automatic environmental control system utilized in conjunction with the maintenance of predetermined climatic conditions within the room or building. It will also be recognized that the provision of the limit switch and its function as an overflow cut-off enables filling of the system with liquid which exceeds the capacity of regions 36, 38 thereby retaining liquid within conduits 32, 34 to keep pump 28 primed. The limit switch incorporates a bypass tube which permits displacement of gas as the liquid 26 enters region 36 or 38 to provide displacement gas for the unused emptying region and permits liquid flow back thereto in the event of limit switch failure and continued operation of the pump after the region to be employed becomes filled with the liquid. Excessive build-up of hydraulic pressure is thus prevented and protection provided for the components of the window in such instances when the limit switch fails to deactivate the motor and pump under liquid filled conditions.

A second embodiment of the invention is illustrated in FIGS. 3–8 of the drawings and will now be described with reference to such figures. As can be seen most clearly from FIGS. 4 and 5, second frame 22 defines, in conjunction with frame 14, hollow compartments 64, 66 at the upper and lower portions respectively. There is formed in both the upper and lower portions of the frame 14 horizontally extending slots 68. Such slots are in alignment with regions 36, 38 between the panes, and each slot is given a length approximately the same as the width of the exposed portion of pane 18, and in any event at least sufficiently long to permit movement therethrough of a sheet of material 70 to be described more fully hereinafter. The slots thus provide openings in frame 14 which communicate with compartments 64, 66 and with regions 36, 38. The second frame 22, although serving to seal sash or frame 14 by extending peripherally thereabout, in the case of the embodiment illustrated in FIGS. 3–8, also provides compartments within which there are mounted rollers 72, 74 for movement of member 70 as will be described.

There is desirably provided a support strip 76 which extends across the width of compartment 64 for the purpose of mounting a pair of bracket members 78, 80 at the lateral extremities thereof. It is within the contemplation of the invention, however, to employ a pair of support strips each of which is used to support one of the bracket members. Each bracket member is given a flange or projection 82 adapted to receive a fastening element therethrough for securing same to the support strip 76. There is also formed within each bracket member a vertical slot 84 dimensioned to slidably receive therein an end portion of the shaft of the roller to be supported. Also carried so as to depend from the support strip or strips 76 are a pair of springs 86, each one of the pair being associated with one end of roller 72. The springs 86 are tensioned so as to exert a biasing force on the roller and thereby on a closed loop of material which includes sheet 70. The length of material, including sheet 70, is thereby held taut against the roller 72 and also against roller 74 positioned in the lower compartment 66 so that the loop of material can move threadedly through the openings formed in frame 14 and through regions 36, 38 between the panes. By proper adjustment of the spring tension, roller 72 will float within the vertical slots of bracket members 78, 80 resting neither at the top nor at the base of such slots.

In the lower compartment 66 there is provided a support strip 88 or a pair of such strips as described in connection with the arrangement of roller 72 and bracket members 78, 80 in the upper compartment. A pair of bracket members 90, 92 extend upwardly from the support strip to which they are connected by appropriate fastening elements. Bracket members 90, 92 allow for the journalling therein of the opposed ends of roller 74.

The lower roller 74 carries at one end thereof a wheel gear 94 which is drivable by a worm gear 96 mounted at the end of a flexible cable 98 driven by a high speed, low torque, reduced size electric motor 100. The use of the flexible cable facilitates location of the motor 100 at any convenient place. A motor mounting board, not shown, may, for example, be positioned within the enclosure wall 12. A set of conductors extends from the motor to a power supply and to switching which may be manual or interconnected with an automatic environmental control system for the room or building as described above in connection with the motor 30 of the embodiment depicted in FIGS. 1 and 2. A control box 102 is desirably connected between conductors 104 leading to the power supply and to motor 100 and is also electrically connected by means of conductors 105a, 105b, 105c and 105d to limit sensor switches 106, 108 which are positioned respectively adjacent regions 36, 38 between the intermediate pane 18 and the inner and outer panes 16, 20. Such sensor switches can thus be employed to generate appropriate signals when attachments to the loop of material which includes sheet member 70 are in an out-of-sight position relative to the panes. Alternatively, of course, such signals may be generated only when the loop and sheet member are not correctly positioned. It will be understood that control box 102 may contain ancillary circuitry such as a transformer and relay circuit which would make it possible to operate the limit switches by means of a low voltage circuit. It will be further appreciated that a three wire set of conductors 104 may be utilized instead of the illustrated two wire set such as when it is desired to feed back information from sensor switches 106, 108 relative to the location of the loop material carried by the rollers. A construction of this type has particular value when it is desired to provide automated remote control of the loop and in order to assure correct disposition of the sheet of solar heat ray absorbent material within either of regions 36 or 38 depending, of course, upon the season.

As mentioned previously, a sheet of flexible material 70 having the capacity for solar heat ray absorption is carried on rollers 72, 74 to be driven by such rollers through the openings in frame 14 created by slots 68 and thence for proper positioning within either of regions 36, 38 depending upon the season. In its preferred form sheet 70 is given a length and width such that when positioned in one of regions 36, 38 it occupies an area substantially equal to that of the exposed portion of pane 18. The sheet 70 thus functions in a manner similar to liquid 26 in the embodiment of FIGS. 1 and 2. In order to form a closed loop of material to be carried by the rollers 72, 74 transverse stiffening elements 110, 112 are secured to the opposed longitudinal end portions of the sheet 70, and at least two string-like elements 114 are connected between the stiffening elements. Desirably, attachment elements 116, which may be formed of an electrically conductive material so that it will be cooperable with the sensor switches, secure the string-like elements 114 to the stiffening elements. Location of elements 116 relative to the panes may thus be ascertained. It will be understood that a flexible non-heat ray absorbent transparent film may be used to form the closed loop of material to be carried by rollers 72, 74 instead of using two string-like elements 114.

As will be understood from the above description, during warm weather seasons the sheet of solar heat ray absorbent material 70 will be positioned within the region between panes 18 and 20 to function in a manner similar to that of liquid 26 in the previously described embodiment. The string-like elements 114 will be located within the region between panes 16, 18 out of the image transmission area of the window. During the cold weather seasons the sheet member 70 will be moved by means of rollers 72, 74 to a location within the region between panes 16, 18. Disposition of string-like elements 114 outside of the image transmission area of the window prevents any obstruction of the view through the window. It will, of course, be appreciated that the sheet of material 70 is selected desirably from those materials which are transparent so as also not to interfere with the transmission of sharp images through the window. However, if desired, material with a tint of color may be utilized in order to ameliorate the glare of the sun's rays.

Although not essential to the embodiment of FIGS. 3-8 a quantity of an inert gas such as dry nitrogen may be maintained within the system comprising compartments 64, 66 and regions 36, 38 to preserve a substantially moisture-free environment therewithin.

It has already been stated that one of the advantages of employing flexible tubes 32b and 34b for the transfer of liquid between regions 36, 38 and pump 28 is to facilitate use of a motorized pump package. It should additionally be recognized that since conduits 32, 34 always contain liquid regardless of which region 36, 38 is to be filled, the differential fluid pressure head will be determined by the height of liquid within the filled region. The flexible transfer tubes can, therefore, be made of any length which is convenient for installation of the pump and motor assembly without affecting the head on the pump. The tubes can thus be located below the window as may be desired, the limiting factor being a hydrostatic pressure from the resulting liquid column in the flexible tubes which will not lead to bursting of the tubes or the pump seals.

From the foregoing description of the invention it will be seen that an all season window construction has been provided which will permit optimum transfer of solar radiated heat to an enclosed environment during cold weather periods while concomitantly minimizing the escape of heat from the closed environment to the outside during such periods. The window construction also minimizes the transfer of solar radiated heat to the enclosed environment during warm weather periods and consequently reduces the amount of energy required to maintain predetermined climatic conditions within the closed environment. The window construction of the invention can further be seen as allowing the transmission of sharp unobstructed images therethrough regardless of whether the window is in use during warm or cold weather seasons.

Although the invention has been described in specific terms it will be understood that various changes may be made in size, shape, materials and in the arrangement of the parts without departing from the spirit and scope of the invention as claimed.

Having thus set forth the nature of the invention, what is claimed herein is:

1. An all season window comprising:
    a peripherally extending pane mounting frame mounting said window in an exterior wall of a structure having an interior space;
    first, second and third panes of essentially rigid transparent sheet material mounted sealingly and fixedly within said frame in spaced parallel relationship each to the other, said second pane being interposed between said first and third panes;
    a discrete amount of solar heat ray absorbent material maintained either at a first location between said first and second panes to provide insulation from solar heat of said interior space or at a second location between said second and third panes to provide solar heat to said interior, said discrete amount being sufficient to substantially fill only one of said locations at a time;
    and means for selectively moving said solar heat ray absorbent material between said first and second locations.

2. A window according to claim 1, including a second frame peripherally enclosing at least the upper and lower portions of said pane mounting frame, said second frame including first and second releasably connectable sections.

3. A window according to claim 2, including through bolt means extendable through said first and second sections for connecting said first and second sections along a plane which extends generally parallel to the said planes.

4. A window according to claim 1, 2 or 3, wherein said solar heat ray absorbent material comprises a liquid.

5. A window according to claim 2 or 3, wherein said pane mounting frame and said second frame define hollow compartments therebetween at the upper and lower portions of said frames, said pane mounting frame having formed therein horizontally extending slots in alignment with each of the regions between the panes and having lengths substantially coextensive with the width of said second pane, said slots penetrating said pane mounting frame to provide openings communicating the upper compartment with the upper portions of the regions between the panes and the lower compartment with the lower portions of the regions between the panes, and including a flexible sheet of solar heat ray absorbent material positioned for movement through said slots between selected ones of said panes.

6. A window according to claim 5, including roller means mounted rotatably within said upper and lower compartments, said sheet material having a width less than said slots and an area which is substantially equal to that of said second pane carried by said rollers for movement through said slots in threaded manner, said sheet material being formed of a solar heat ray absorbent material.

7. A window according to claim 6, wherein said sheet is connected at its opposed horizontal edges to at least two string-like elements to thereby form a closed loop.

8. A window according to claim 7, wherein said string-like elements are positioned laterally along said sheet so as not to be visible when viewing through said panes.

9. A window according to claim 7, including a bracket member positioned within said upper compartment for supporting each end of the roller means therein in vertically guided fashion, each said bracket member thus being provided with a vertical slot, the ends of said roller means being slidable within said slots, spring means being secured within said upper compartment adjacent each said bracket member cooperable with the respective ends of said roller means for biasing same to maintain predetermined longitudinal tension on said loop.

10. A window according to claim 7, including transversely extending stiffening means for said string-like elements to prevent longitudinal bowing of the loop.

11. A window according to claim 6, including a gear wheel carried by said lower roller means, a drive motor, a flexible cable drivable by said motor having a worm gear at the end thereof remote from the motor and cooperable with said wheel gear for driving the lower roller means.

12. A window according to claim 6, wherein said second frame hermetically seals said pane mounting frame and an inert gas is maintained within the system comprising said compartments and the regions between said panes.

13. A window according to claim 7, including transverse stiffening elements carried by said sheet at the opposed horizontal end portions thereof, said string-like elements being secured to attachment members which are in turn secured to said stiffening elements, sensor switch means being provided cooperable with said attachment members and adapted to generate a signal when said sheet is not in correct disposition relative to said panes.

14. An all season window comprising:
- a peripherally extending pane mounting frame mounting said window in an exterior wall of a structure having an interior space;
- first, second and third panes of essentially rigid transparent sheet material mounted sealingly and fixedly within said frame in spaced parallel relationship each to the other, said second pane being interposed between said first and third panes;
- a discrete amount of solar heat ray absorbent material maintained either at a first location between said first and second panes to provide insulation from solar heat of said interior space or at a second location between said second and third panes to provide solar heat to said interior, said discrete amount being sufficient to substantially fill only one of said locations at a time;
- and means for selectively moving said solar heat ray absorbent material between said first and second locations;
- said solar heat ray absorbent material comprising a liquid;
- said means for moving said solar heat absorbent material comprises a pump, motor means, a first conduit connecting said first location to said pump and a second conduit connecting said second location to said pump.

15. A window according to claim 14, including a second set of first and second conduits communicating respectively at one of the ends thereof with the respective regions between said first and second panes and between said second and third panes, a by-pass overflow conduit being connected between the other ends of said conduits, said second set of conduits extending through the upper portion of said pane mounting frame into the upper portions of said regions, said first set of conduits extending through the lower portion of said pane mounting frame into the lower portions of said regions.

16. A window according to claim 15, including a limit switch having sensors operably associated with said second set of conduits and with said motor means for deactivation of the motor means upon the pumping of said solar heat ray absorbent material to a predetermined level within one of the regions between said panes.

17. A window according to claim 14, wherein said first set of conduits include relatively rigid conduits mounted in said pane mounting frame and flexible tubing connected between said rigid conduits and said pump.

18. A window according to claim 14, 15, 16 or 17, wherein said motor means comprises a reversible electric motor.

* * * * *